No. 717,797. PATENTED JAN. 6, 1903.
J. J. BARRON.
PLANT THINNING MACHINE.
APPLICATION FILED APR. 10, 1902.
NO MODEL. 2 SHEETS—SHEET 1.

WITNESSES:
INVENTOR.
J. J. Barron.
BY
ATTORNEY.

No. 717,797. PATENTED JAN. 6, 1903.
J. J. BARRON.
PLANT THINNING MACHINE.
APPLICATION FILED APR. 10, 1902.
NO MODEL. 2 SHEETS—SHEET 2.

WITNESSES:

INVENTOR.
J. J. Barron.
BY
ATTORNEY.

UNITED STATES PATENT OFFICE.

JOHN J. BARRON, OF BOULDER, COLORADO, ASSIGNOR OF ONE-HALF TO EDWIN L. COATES AND EDWARD C. MASON, OF BOULDER, COLORADO.

PLANT-THINNING MACHINE.

SPECIFICATION forming part of Letters Patent No. 717,797, dated January 6, 1903.

Application filed April 10, 1902. Serial No. 102,304. (No model.)

*To all whom it may concern:*

Be it known that I, JOHN J. BARRON, a citizen of the United States of America, residing at Boulder, in the county of Boulder and State of Colorado, have invented certain new and useful Improvements in Plant-Thinning Machines; and I do declare the following to be a full, clear, and exact description of the invention, such as will enable others skilled in the art to which it appertains to make and use the same, reference being had to the accompanying drawings, and to the characters of reference marked thereon, which form a part of this specification.

My invention relates to improvements in machines for thinning young plants where the seeds have been planted in rows and the plants are too thick for normal or healthy growth.

My object is to provide a machine of this class which shall be adapted to perform the aforesaid function rapidly and which shall at the same time have an attachment whereby the plants may be cultivated and the weeds removed between the rows simultaneously with the thinning operation; and to these ends the invention consists of the features, arrangements, and combinations hereinafter described and claimed, all of which will be fully understood by reference to the accompanying drawings, in which is illustrated an embodiment thereof.

Figure 1:
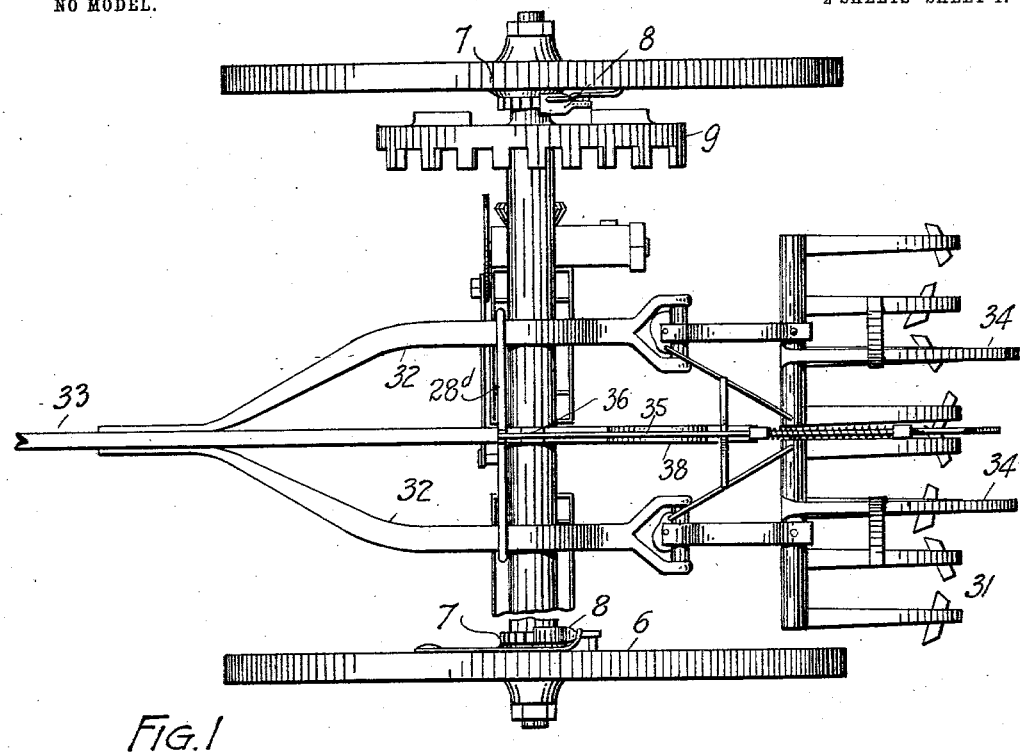
Figure 2:
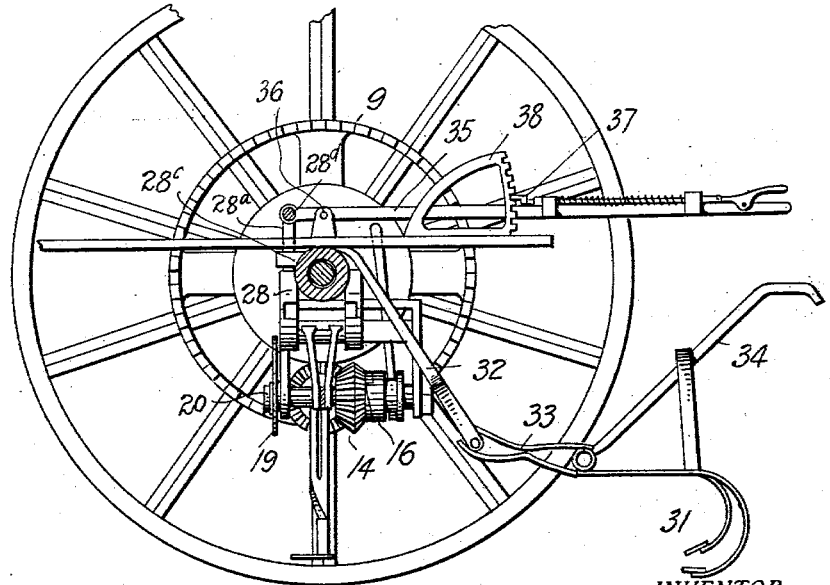
Figure 3:
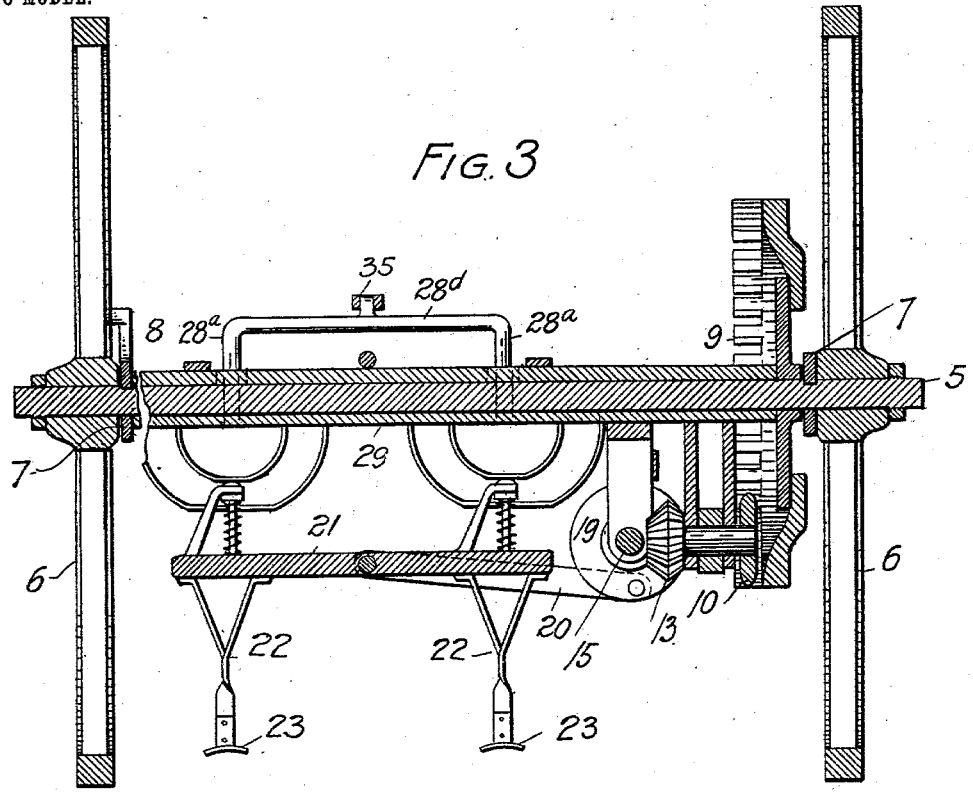
Figure 4:
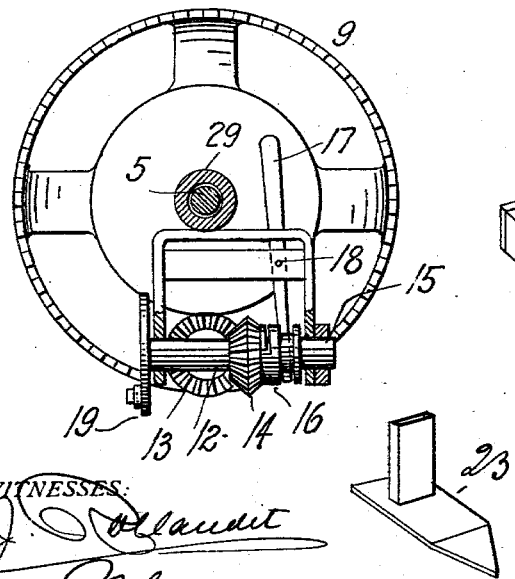
Figure 5:
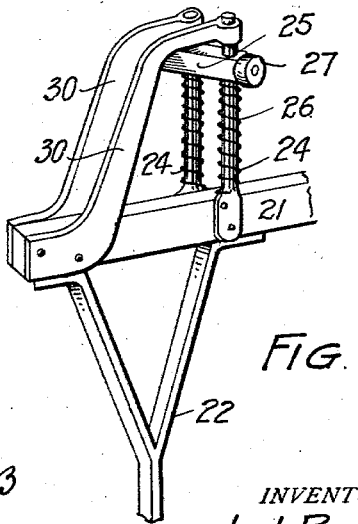
Figure 6:
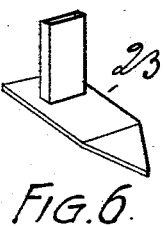

In the drawings, Figure 1 is a top or plan view of my improved machine. Fig. 2 is a cross-section taken through the axle, the operating parts being shown in side elevation. Fig. 3 is a longitudinal section taken through the axle of the machine, the mechanism being viewed from the rear. Fig. 4 is a cross-section taken through the axle, showing the main gear-wheel and the mechanism operated thereby. Fig. 5 is a fragmentary perspective view of the transversely-reciprocating frame, showing one of the spring-supported cross-heads. Fig. 6 is a perspective detail view showing one of the hoes or devices for thinning or cutting out the plants by a reciprocating movement.

The same reference characters indicate the same parts in all the views.

Let the numeral 5 designate the main shaft or axle, loosely mounted on the ground-wheels 6. Made fast to the axle near each wheel 6 is a ratchet 7, engaged by a dog 8, made fast on the wheel, the arrangement being such that when the machine is moving forward the axle will be turned. Made fast to the axle adjacent one of the ground-wheels is a large annular gear 9, meshing with a small gear 10, fast on a short shaft 12. To the extremity of this shaft remote from the gear 10 is made fast a bevel-gear 13, meshing with a similar gear 14, loose on a shaft 15, extending at right angles to the shaft 12. The gear 14 is provided with a clutch-face connected to cooperate with a clutch member 16, splined on the shaft 15, whereby it is slidable thereon and turns therewith. This clutch member is shifted to cause it to engage the corresponding clutch-face of the gear 14 by moving a lever 17 in the proper direction. This lever is fulcrumed on the stationary framework of the machine, as shown at 18.

Made fast to one extremity of the shaft 15 is a crank-wheel 19. To a wrist-pin on this wheel is connected one extremity of a pitman 20, whose opposite extremity is connected with the central part of a bar 21, to which are attached two hangers 22. To the lower extremities of these hangers are attached the hoes 23, employed in thinning the plants.

Made fast to and projecting upwardly from the bar 21, near each end thereof, are two vertical arms 24, upon which is slidably mounted a cross-head 25, supported by springs 26, coiled around the arms 24 below the cross-head. Upon one extremity of the cross-head 25 is mounted an antifrictional roller 27, which engages a guide 28, provided with an upwardly-projecting stem 28ª, passing through a guide ring or sleeve 28ᶜ, mounted on a sleeve or hollow axle 29, in which the axle 5 is journaled. The guides are constructed to form ways for the cross-head roller and are curved upwardly at their extremities to give the bar 21 an upward movement at the ends of its stroke in order to lift the hoes 23 out of the ground after each plant-thinning or cutting-out act.

Connected with the upper extremities of the arms 24 are braces 30, whose respective extremities form stops to limit the upward movement of the cross-heads 25. The lower extremities of each pair of these bars are secured to one extremity of the bar 21.

The upper extremities of the stems 28 of the guides are connected by a cross-piece $28^d$, to which is centrally attached one extremity of a lever 35, fulcrumed at 36 and provided with the usual spring-held locking-dog 37, engaging a notched bar or quadrant 38.

My improved machine, as shown in the drawings and herein described, is intended to thin two rows of plants at the same time. As the machine is moved forward over the field, assuming that the clutch member 16 is in operative engagement with the clutch-face of the gear 14, the axle 5 is rotated and a transversely-reciprocating movement imparted to the bar 21 by virtue of the construction and arrangement of parts heretofore described. As the bar 21 reciprocates the hoes 23 are thrust into the ground far enough to cut the roots of the plants and move back and forth through the plant-rows. The length of each hoe should be about the distance required between the individual plants of each row. The speed of the bar 21 or of the reciprocating hoes or cutters 23 is so timed with reference to the forward travel of the machine that the plants are properly thinned. Each hoe cuts through its row of plants while moving in both directions. Located behind the cutting-hoes and arranged to straddle each row of plants and throw dirt around them after they are thinned are teeth 31, suitably connected to draw-bars 32 by links 33. These bars extend forwardly over the axle and connect with the tongue or pole 33 of the machine on opposite sides.

Any suitable arrangement of teeth may be employed, and the set of teeth for each row of plants may be controlled by a handle 34, manipulated by the user of the machine, who walks behind. When the machine is not in use and when traveling from place to place, it may be thrown out of gear by shifting the clutch member 16, whereby the latter is disengaged from the clutch-face of the gear 14.

When not in use, the hoes may be raised above the surface of the ground by the lever 35, which by lifting the guides raises the hoes. The hoes and guides are shown in the raised position in Fig. 2.

Having thus described my invention, what I claim is—

1. In a machine for thinning young plants growing in rows, the combination with a suitable frame and ground-wheels, of a bar mounted to reciprocate on the frame in a direction transverse to the travel of the machine, a hoe connected with said bar, an arm projecting upwardly from the bar and provided with a projection, and a curved guide engaged by said projection, substantially as described.

2. In a machine of the class described, the combination with a frame and ground-wheels, of a bar mounted to reciprocate on said frame, hoes mounted on said bar, arms projecting upwardly from the bar and provided with cross-heads, curved guides engaged by the cross-heads, and cultivator-teeth located in the rear of the hoes, substantially as described.

3. In a machine of the class described, the combination with a frame and ground-wheels, of a bar mounted to reciprocate on said frame in a direction transverse to the travel of the machine, and actuated from the ground-wheels, hoes carried by the bar, arms projecting upwardly from the bar and provided with projections, and curved guides engaged by said projections.

4. The combination with a frame and ground-wheels, of a main shaft or axle loosely engaged by the ground-wheels, a ratchet-and-dog connection between the axle and said wheels whereby the axle is actuated by the wheels during the forward travel of the machine, a bar mounted to reciprocate on the frame, hoes mounted on said bar, arms projecting upwardly from the bar and provided with projections, vertically-movable guides engaged by said projections, and suitable mechanism interposed between the axle and the bar for reciprocating the latter, substantially as described.

5. In a machine of the class described, the combination with a frame and ground-wheels, of a bar extending transversely to the travel of the machine, a hoe carried by the bar, an arm projecting upwardly from the bar and provided with a projection, a vertically-movable guide mounted on the frame and engaged by said projection, and a suitable operative connection between the bar and the ground-wheels, substantially as described.

6. In a machine of the class described, the combination with a frame and ground-wheels, of a bar extending transversely to the travel of the machine, a depending hoe mounted on the bar, an arm projecting upwardly from the bar, a spring-supported cross-head mounted on said arm, and a guide which the cross-head engages, substantially as described.

7. In a machine of the class described, the combination with a frame and ground-wheels, of an axle loose on the ground-wheels, a ratchet-and-dog connection between the axle and the ground-wheels whereby the axle is operated during the forward movement of the machine, a large gear fast on the axle, a shaft journaled on the frame, a gear fast on the shaft and meshing with the large gear, a beveled gear fast on the shaft, a second shaft journaled in the frame, a gear loose on the second shaft and meshing with the beveled gear of the first shaft, a clutch member splined on the second shaft and slidable to engage a clutch-face on the last-named gear, a crank-wheel fast on the second shaft, a pitman having one extremity connected with the crank-wheel, a bar extending transversely to the travel of the machine and connected with the opposite extremity of the pitman, depending hoes mounted on the bar, arms projecting upwardly from the bar and provided with projections, and vertically-movable guides engaged by the projections, and suitable means for supporting the bar to permit a transverse movement, substantially as described.

8. In a machine of the class described, the combination with a frame and ground-wheels, of a bar extending transversely to the travel of the machine, hoes carried by the bar, arms projecting upwardly from the bar and provided with projections, vertically-movable guides mounted on the frame and engaged by said projections, and a suitable operative connection between the bar and the ground-wheels, substantially as described.

9. In a machine of the class described, the combination with a frame and ground-wheels, of a bar extending transversely to the travel of the machine, hoes mounted on the bar, arms projecting upwardly from the bar, cross-heads mounted on said arms, and vertically-movable guides which the cross-heads engage, substantially as described.

10. In a machine of the class described, the combination with a frame and ground-wheels, of a bar extending transversely to the travel of the frame, hoes mounted on the bar, arms projecting upwardly from the bar, cross-heads mounted on said arms, vertically-movable guides which the cross-heads engage, said guides being provided with upwardly-projecting stems, sleeves or rings mounted on the frame through which sleeves the stems of the guides pass, a bar connecting the stems above the guides, and an operating-lever connected with the said stem-connecting bar, substantially as described.

In testimony whereof I affix my signature in presence of two witnesses.

JOHN J. BARRON.

Witnesses:
DENA NELSON,
A. J. O'BRIEN.